Figure 1:
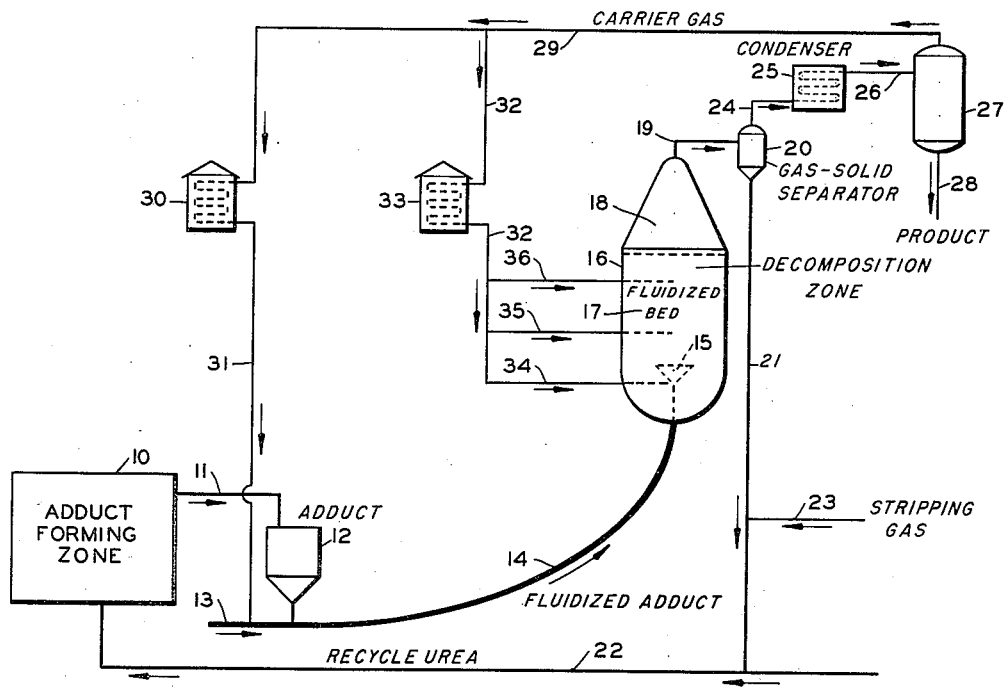

Nov. 25, 1952            G. C. RAY            2,619,501

PROCESS FOR DECOMPOSING ADDUCTS

Filed April 10, 1950

INVENTOR.
G. C. RAY
BY Hudson & Young
ATTORNEYS

UNITED STATES PATENT OFFICE 2,619,501

PROCESS FOR DECOMPOSING ADDUCTS

Gardner C. Ray, Bartlesville, Okla., assignor to Phillips Petroleum Company, a corporation of Delaware Application April 10, 1950, Serial No. 155,001

12 Claims. (Cl. 260—552)

This invention relates to a process for the decomposition of adducts of urea and thiourea with straight carbon atom chain and branched carbon atom chain organic compounds. In one of its aspects, it relates to a process for decomposing such adducts while suspended in a fluidized state. In another of its aspects, this invention relates to a process for decomposing said adducts while suspended in a fluidized bed and for effecting a ready separation of the resultant urea and thiourea from the fluidized bed.

There has recently been discovered a process for the separation of hydrocarbons in accordance with their chain types by forming adducts selectively between the hydrocarbons and urea or thiourea. Thus, mixtures of straight carbon atom chain hydrocarbons, such as n-octane, and branched carbon atom chain hydrocarbons, such as isooctane, can be separated into fractions comprising straight-chain and branched-chain hydrocarbons by treating the mixture with thiourea which forms crystalline adducts with the branched-chain hydrocarbons but not with the straight-chain hydrocarbons. The resulting crystalline adduct is then separated from remaining non-adduct forming hydrocarbons by filtration. It is known that when these adducts are contacted with water, they decompose to the original hydrocarbon and to urea or thiourea, as the case may be. They also can be decomposed by heating to a suitable decomposition temperature, usually about 100 to 150° F. In cases where the adduct is broken down with water, the liberated urea or thiourea dissolves in the water and usually must be crystallized therefrom with resultant excessive energy consumption, before recycling it to again form additional adducts. On the other hand, when the adduct is not contacted with water but is merely heated in the dry crystalline state to effect its decomposition, it is difficult to effectively decompose it without locally overheating a crystalline mass thereof. Thus, urea melts at about 270.9° F. and any local overheating will easily cause the urea crystals to reach their incipient melting temperature and fuse into masses which are difficult to handle in the adduct forming process. Thus, it is apparent that it would be highly advantageous to possess a process for decomposing urea or thiourea adducts without dissolution in a solvent, such as water, with the resultant expensive recovery of the liberated urea or thiourea or without causing any overheating of the crystalline urea or thiourea so as to cause it to fuse.

It has now been found that an adduct formed between a straight-chain organic compound and urea or between a branched-chain organic compound and thiourea can be effectively decomposed in the dry state without causing overheating thereof by suspending the crystalline adducts in a suitable carrier gas and decomposing the adducts while suspended in such gas. The adducts are preferably passed while in a suspended state into a vessel wherein they form a fluidized bed. The adducts remain suspended in such a bed until they are decomposed after which the decomposition products, i. e. urea or thiourea and the adducted organic compound, are withdrawn therefrom. When operating in this manner, uniform distribution of heat and hence a uniform temperature between the individual crystals of the adduct is ensured. Further, since the adduct is contacted only with an inert carrier gas which does not dissolve the adduct or the liberated urea or thiourea, no problem of separating dissolved urea or thiourea from a solvent is presented.

It has also been found that the depth of a fluidized bed of the urea or thiourea-organic compound adducts and the residence time of such adducts of the liberated urea or thiourea in such a bed can be easily and readily controlled by controlling the temperature of the adduct crystals. Thus, the adducts will substantially decompose within a temperature range which is specific for each specific adduct to liberate the urea or thiourea, as the case may be, and the adducted organic compound. When the adducted organic compound has a boiling point below the decomposition temperature of the adduct, the liberated organic compound will be vaporized thereby greatly increasing the gaseous volume in the bed of suspended adduct. This increase in gaseous volume will cause the gas velocity through a portion of the bed to increase thereby causing the liberated urea or thiourea to be carried from the bed. Thus, the liberated organic compound will vaporize and cause such an increase in the velocity of the gaseous carrier for the liberated urea or thiourea that the latter will be effectively removed from the fluidized bed.

Thus, according to this invention, there is provided a process for decomposing an adduct of a straight-chain organic compound and urea or an adduct of a branched-chain organic compound and thiourea in the absence of a solvent and without overheating of the adducts or of the liberated urea or thiourea which comprises suspending the adducts in a carrier gas to form a fluidized bed of said adduct and heating the said bed to cause said adducts to decompose. Further according to this invention, there is provided a process for decomposing such adducts which comprises suspending them in a hot carrier gas which supplies sufficient heat to cause said adducts to decompose while suspended as a fluidized bed and concomitantly provides a means for carrying the liberated urea or thiourea and the liberated organic compound from said fluidized bed without causing any overheating of the adducts or the liberated products. Still according to this invention, there is provided a process for decomposing said adducts and for controlling the depth of a fluidized bed of the same and for regulating the residence time of said adducts in said bed which comprises suspending the said adducts in a carrier gas to form a fluidized bed thereof, heating said adducts at such a rate and in such a manner that the liberated organic compound will vaporize and thereby increase the carrier gas velocity through a portion of said bed to such an extent that the liberated urea or thiourea will be carried from said bed in a positive fashion without having to decrease the residence time of said adducts in said bed.

Still further according to this invention, it has been found that said adducts can readily be decomposed by suspending them in a carrier gas in a settling zone wherein the solid crystals of adduct and/or urea or thiourea pass upwardly at a rate slower than the said carrier gas, heating the said adduct contained in said zone in such a manner and at such a rate that the liberated organic compound will become vaporized to increase the velocity of carrier gas through a portion of said zone thereby causing the liberated urea and thiourea to be carried from said zone without decreasing the residence time of said adduct in said zone.

Figure 2:
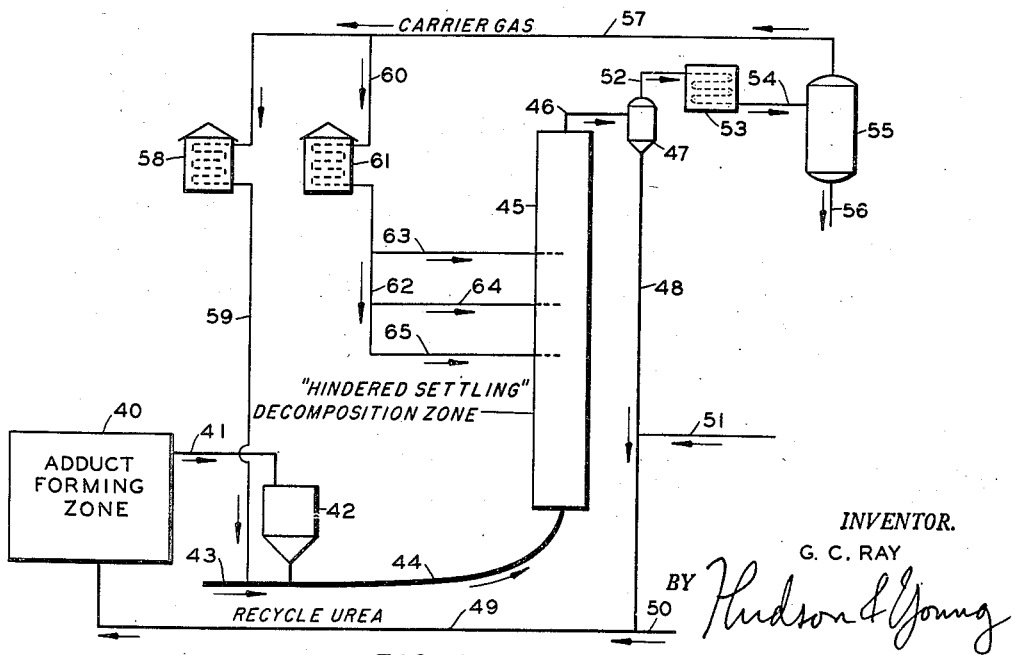

In order to more fully describe the process of this invention, a specific embodiment will be illustrated with particular reference to the attached drawings. In the drawings, Figure 1 represents an embodiment of this invention wherein an adduct is suspended in a fluidized bed to effect its decomposition. Figure 2 illustrates another embodiment of this invention wherein an adduct is suspended in a "hindered settling" zone.

In Figure 1, an adduct between a straight carbon atom chain organic compound and urea or a branched carbon atom chain compound and thiourea is formed in a zone designated generally by the numeral 10. In general, the adduct is formed by contacting a straight-chain organic compound with urea in the presence of an activator-solvent such as methanol, water, or the like or, alternatively, a branched-chain or cyclic organic compound with thiourea. The straight-chain compound can be mixed with branched-chain or cyclic organic compounds which, in general, do not form adducts with urea. The straight-chain compound can comprise one or more of a normal alkane or alkene hydrocarbon having from six to fifty carbon atoms in the molecule such as hexane, hexene, heptane, heptene, octane, octene, nonane, nonene, decane, decene, and progressively higher molecular weight alkanes and alkenes up to and including those containing fifty carbon atoms. The straight-chain compound can also be an alcohol having from six to fifty carbon atoms and being either saturated or unsaturated and thus corresponding in carbon atom structure to the aforementioned alkanes and alkenes. The straight-chain organic compound can be admixed with such nonadduct forming branched-chain and/or cyclic organic compounds as isohexane, ethylhexane, isohexene, isoheptane, isoheptene, ethylheptane, ethylcyclooctane, trimethylnonane, cyclohexane, cyclopentane, cyclooctane, methylcyclohexane, benzene, toluene, naphthene, cymene, isopropylbenzene, butylbenzene, propenylbenzene and biphenyl or with alcohols corresponding to the foregoing class of branched-chain and cyclic hydrocarbons with which urea does not form an adduct. The adduct which is to be treated according to this invention can also be formed by reacting a branched-chain organic compound with thiourea in the presence of an activator such as methanol, water, or the like. The branched-chain organic compound can comprise any of those named above and, in general, can be any hydrocarbon, alcohol, amine or such having from six to fifty carbon atoms and having in addition one or more side carbon atom chains which contain from one to twenty or more carbon atoms. The branched chain compound can be admixed with straight-chain organic compounds similar to those mentioned above or with certain cyclic or aromatic organic compounds which do not form adducts with thiourea. In any event, the adduct is separated as a crystalline solid from any accompanying liquids such as non-reacting organic compounds and utilized as the feed from the process of this invention.

The urea and thiourea can be activated with a number of compounds such as the lower boiling aliphatic alcohols, e. g. methanol and ethanol; the organic nitrogen base compounds such as monomethylamine, the ethanolamines, pyridine and picoline; and the various esters, ketones, and ethers in which urea or thiourea is substantially soluble.

The general process for forming such adducts does not constitute a part of the essential inventive concept of this invention and a more detailed description of their preparation can be found in application Serial No. 155,061, filed April 10, 1950, by W. N. Axe and in application Serial No. 155,134, filed April 10, 1950, by Joseph Ackerman, and the disclosures contained therein are incorporated herein by reference for a more complete discussion of the adducts and the compounds and methods by which they are formed.

After the adducts have been formed as crystalline solids in zone 10, they can be passed via line 11 to a hopper 12. A carrier gas passing through line 13 picks up the adducts from hopper 12 and carries them as a gaseous suspension of crystalline solids through line 14 to distributing header 15 in decomposition zone 16. The carrier gas can be any suitable gas which is substantially inert to the adduct such as nitrogen; natural gas; normally gaseous hydrocarbons containing less than six carbon atoms such as methane, ethane, propane, butane and pentane; and oxygen-free flue gases. The carrier gas is passed through line 14 at such a velocity that the adduct crystals will remain suspended in it without any substantial settling in the line but at a velocity low enough to avoid any undue attrition of the crystals. Ordinarily, a carrier gas velocity within the range of 20 to 60, preferably 30 to 40, feet per second will be sufficient for adduct crystals having a mesh size from 40 to 100 standard mesh. Larger or smaller mesh sizes of adduct crystals will permit a corresponding variation in the velocity of the carrier gas. However, the optimum velocity can readily be determined for any given instance by mere routine test.

The size of decomposition zone 16 and the velocity of carrier gas therethrough is adjusted to be such that the crystalline adduct will form a fluidized bed 17 therein. When the velocity of the carrier gas is properly adjusted in zone 16 and such adjustment can be made by mere routine test, fluidized bed 17 will have the appearance of a boiling liquid having a more or less well-defined upper surface. Above such upper surface will be a less-dense phase 18 comprising carrier gas and suspended crystalline urea or thiourea which escape from fluidized bed 17. Ordinarily, a carrier gas velocity, based on the cross-sectional area of zone 16 when empty, within the range of 0.5 to 10, preferably from 1 to 3, feet per second will be sufficient to form a satisfactory fluidized bed of adduct 17 when the particle size of the urea or thiourea employed is between 40 and 100 mesh. The carrier gas and entrained urea or thiourea, which results from the decomposition of the adduct in fluidized bed 17, as well as liberated organic compound flows upwardly through less-dense phase 18 into effluent line 19 and thence into a gas-solid separating means 20. Such means can be a cyclone separator, an electrostatic precipitator, a bag filter or a combination of any two or more of these. The separated urea or thiourea flows through stand-pipe or line 21 to line 22 and is suspended therein by a carrier gas which can be the same or different carrier gas as that employed to transport the adduct in line 14. An inert stripping gas can be injected through line 23 to ensure that any organic compounds which may escape into line 21 with the urea or thiourea are stripped from the urea or thiourea and returned to separating means 20. The stripping gas should be inert with respect to the urea or thiourea as well as to any organic compound it may contact. It can be carrier gas similar to that in lines 14 and 22 and sufficient quantity of it should be injected into stand-pipe 21 to sweep any organic compound from the urea or thiourea but insufficient to cause the urea or thiourea to become completely suspended therein so as to either clog stand-pipe 21 or to carry the urea or thiourea back into separating means 20. The gases and organic compound from which the urea or thiourea have been separated in separating means 20 emerge therefrom through line 24 and pass to cooler 25 wherein the organic compound can be condensed. The condensed organic compound and accompanying carrier gas flows via line 26 to gas-liquid separator 27 and carrier gas is returned via line 29, heater 30 and line 31 to line 13 to again pick up adduct from hopper 12 on its way to decomposition zone 16. The condensed organic compound is removed from the system via line 28.

Alternatively, the liberated urea or thiourea as well as the liberated organic compound can be withdrawn from bed 17 via a standpipe (not shown), inserted in zone 16 and terminating near the upper surface of bed 17. This is particularly advantageous when the adducted organic compound is not vaporizable or suspendable in the effluent carrier gas.

Heater 30 can be operated to sufficiently heat the carrier gas passing therethrough so that it will supply all the heat necessary to preheat the adduct from hopper 12 and to cause its decomposition in zone 16. When so operating, heater 30 should heat the carrier gas to a temperature within the range of 150 to 225° F., preferably 160 to 200° F.

A portion of the carrier gas can be removed from line 29 through line 32 and then heated in heater 33 before being injected as an auxiliary carrier gas by line 34 into distributing means 15 or at one or more points in bed 17 by lines 35 and 36. Thus, when employing heater 33, heater 30 can be either omitted or employed to merely heat the carrier gas in line 31 to a temperature such that when admixed with the adduct from hopper 12, the adduct is preheated but is not heated enough to effect its decomposition. Thus, heater 30 can preheat the carrier gas to a temperature within the range of 80 to 150° F. depending upon the threshold decomposition temperature of the individual adduct. Then, heater 33 can be employed to heat the portion of the carrier gas passing therethrough to a temperature such that upon its contact with the adduct in zone 16, the adduct will be adequately heated to a temperature at which it will readily decompose. The temperature at which the auxiliary carrier gas is heated in heater 33 should be within the range of 200 to 250° F. Then, by controlling the point at which the auxiliary carrier gas is injected in zone 16, the level at which the adduct in bed 17 decomposes can be controlled. For example, if the suspended adduct in line 14 is merely preheated and the hot auxiliary carrier gas from heater 33 is injected into bed 17 through line 35, then the major proportion of the adduct in bed 17 will decompose in the immediate vicinity of line 35. The auxiliary carrier gas passing through heater 33 can be heated to supply sufficient heat to vaporize the organic compound liberated by the decomposition of adduct in bed 17 and when so operating, the vaporized organic compound will increase the velocity of the carrier gas passing upwardly through bed 17 thereby causing it to carry liberated urea or thiourea from bed 17 to separating means 20 without affecting the residence time of the undecomposed adduct residing in bed 17 below the injection point of the hot auxiliary carrier gas.

Thus, it is readily apparent when operating in the above-described manner, the adduct can be permitted to remain in the lower portion of bed 17 for a period of time sufficient to enable carrier gas from heater 30 and line 14 to adequately preheat it to a threshold decomposition temperature. The thus preheated adduct can then be further heated by hot injected auxiliary carrier gas from heater 33 and line 32 to effect its decomposition into urea or thiourea, as the case may be, and the adducted compound which is concomitantly vaporized by the hot auxiliary carrier gas to cause it to increase the carrier gas velocity above the point of injection of the hot auxiliary carrier gas thereby sweeping liberated urea and thiourea from the bed without affecting the residence time of the adduct being preheated below such point of injection in bed 17.

Figure 2 illustrates another embodiment of this invention. In the figure, an adduct is formed in adduct-forming zone 40 similarly to that in zone 10 of Figure 1. The adduct is passed by line 41 to hopper 42 from where it is picked up by an inert carrier gas in line 43. The resulting suspension of adduct in carrier gas passes through line 44 to decomposition 45. The carrier gas composition and its velocity through line 44 is similar to that set forth with respect to Figure 1. Decomposition zone 45 is an elongated zone having a substantially constant cross-sectional area. The carrier gas containing the suspended adduct is injected into its lower portion via line 44 to pass upwardly therethrough at such a velocity that the adduct particles or crystals pass upwardly at a velocity somewhat lower than that of the carrier gas. Thus, zone 45 is one of "hindered settling." The velocity of the carrier gas in order to effect such hindered settling will depend largely upon the size and shape of the adduct crystals but, ordinarily, a gas velocity, based on the empty cross-sectional area of zone 45, within the range of 3 to 20, preferably from 4 to 10, feet per second will be adequate for adduct crystals falling within the range of 40 to 100 standard mesh size.

The adduct is decomposed in zone 45 by means of heat supplied as hereinafter described. The decomposition products, namely urea or thiourea, as the case may be, and the adducted organic compound pass out of zone 45 along with accompanying carrier gas through line 46 to solid-gas separating means 47 which can be a cyclone separator, bag separator or such. The separated urea or thiourea passes downwardly from separating means 47 through standpipe or line 48 to be picked up and suspended in line 49 by a carrier gas which can be similar to that used in line 43, injected via line 50. The suspension of urea or thiourea then flows to adduct forming zone 40 to complete the cycle. A stripping medium, such as the carrier gas, can be injected via line 51 into stand-pipe 48 to sweep any organic compound from the urea or thiourea crystals flowing therethrough.

The separated gases from separating means 47 flow through line 52 to cooler 53 wherein they are cooled sufficiently to liquify the organic compound contained therein. The liquid organic compound is separated from the uncondensed gases in liquid-gas separator 55 and passes from line 56 to subsequent processing steps (not shown) or as a product of the process. The gas from separator 55 is essentially the original carrier gas and passes through line 57 to heater 58 and thence to line 43 via 59 to complete its cycle.

A portion of the recycled carrier gas is employed as an auxiliary carrier gas and is passed from line 57 through line 60 and heater 61 to injection header 62. A plurality of injection lines 63, 64 and 65 are employed to inject the auxiliary carrier gas into zone 45 at one or more points intermediate its ends.

In operation, heater 58 is employed to heat the carrier gas flowing through line 44 just sufficiently to preheat the adduct to its incipient decomposition temperature. Heater 61 heats the auxiliary carrier gas passing therethrough to a temperature sufficiently high that when the carrier gas is injected through lines 63, 64 and/or 65, the preheated adduct will be further heated to accomplish its substantial decomposition and, further, to vaporize and, if desired, superheat the liberated organic compound. The thus vaporized organic compound will cause the volume of gas passing through zone 45 above the injection points 63, 64 or 65 to greatly increase and permits the liberated urea or thiourea to be carried from zone 45 without affecting the residence time of the adduct being preheated below the auxiliary carrier gas injection point. In a preferred mode, the auxiliary hot carrier gas injected through lines 63, 64 or 65 is not of sufficient volume to cause such an increase of carrier gas velocity through zone 45 that the adduct is removed therefrom before it is decomposed. The function of increasing the carrier gas velocity enough to sweep urea and thiourea from zone 45 should be relegated to the liberated and vaporized organic compound. This can be accomplished by heating the auxiliary carrier gas in heater 61 to a high enough temperature that its volume can be maintained at a minimum.

With respect to Figure 2, the temperature to which the adduct is preheated before it begins to substantially decompose will be dependent upon the characteristics of each individual adduct but, in general, will lie within the range of 80 to 150° F. The carrier gas employed to carry the adduct to its decomposition zone should be at a temperature from 5 to 10° F. below the decomposition temperature of the individual adduct which temperature will be within the range of 70 to 145° F. The auxiliary carrier gas should be heated to a temperature immediately below the fusion point of the urea or thiourea compound and will preferably be below 270° F. and ordinarily will be within the range of 200 to 250° F. Its volume should be sufficient to supply the required heat to decompose the adduct and to vaporize the adducted organic compound. Ordinarily, its volume can be from ten to sixty per cent of the volume of carrier gas employed to preheat the adduct i. e. that in line 44.

When operating in accordance of those embodiments of this invention wherein the adducted organic compound is vaporized in the decomposition zone, it is preferable that such organic compound have a boiling point below about 260° F., and preferably below about 220° F. Thus when the organic compound is a hydrocarbon, it should be a $C_6$ to $C_8$ aliphatic hydrocarbon. However, higher boiling hydrocarbons can be employed when admixed with substantial quantities of the lower boiling hydrocarbons to ensure sufficient vaporization to substantially increase the carrier gas velocity in the decomposition zone so that the liberated urea or thiourea will be carried therefrom.

While the invention has been described in connection with present preferred embodiments thereof, it is to be understood that this description is illustrative only and is not intended to limit the invention, the scope of which is defined by the appended claims.

I claim:

1. A process for decomposing an adduct formed by reacting urea with a straight carbon atom chain hydrocarbon having at least six carbon atoms per molecule and a boiling point below the melting point of said urea which comprises suspending said adduct in an inert carrier gas selected from the class comprising nitrogen, natural gas, oxygen-free flue gas and a low-boiling hydrocarbon having from one to five carbon atoms per molecule and preheated to a temperature within the range of 70° to 145° F. whereby said adduct is heated to a temperature immediately below the temperature at which it begins to decompose, passing said suspension of said adduct through a decomposition zone at a carrier gas velocity between 3 to 20 feet per second whereby said carrier gas is passed through said zone at an upward velocity greater than that of said adduct, injecting an auxiliary carrier gas of the same composition as first said carrier gas but preheated to a temperature within the range of 200 to 250° F. into said zone at a point intermediate its ends whereby said adduct is decomposed and the liberated hydrocarbon vaporized to increase the carrier gas velocity through said zone above said point where said injected carrier gas is injected, removing a resultant suspension of liberated urea from said zone, and separating last-said suspension to recover said urea, liberated hydrocarbon and said carrier gas.

2. A process for decomposing an adduct formed by reacting thiourea with a branched carbon atom chain hydrocarbon having at least six carbon atoms per molecule and having a boiling point below the melting point of said thiourea which comprises suspending said adduct in an inert carrier gas selected from the group consisting of nitrogen, natural gas, oxygen-free flue gas, and a low-boiling hydrocarbon having from one to four carbon atoms per molecule and preheated to a temperature within the range of 70° to 145° F. whereby said adduct is heated to a temperature immediately below the temperature at which it begins to decompose, passing said suspension of said adduct through a decomposition zone at a carrier gas velocity between 3 to 20 feet per second whereby said carrier gas is passed through said zone at an upward velocity greater than that of said adduct, injecting an auxiliary carrier gas of the same composition as first said carrier gas but preheated to a temperature within the range of 200 to 250° F. into said zone at a point intermediate its ends whereby said adduct is decomposed and the liberated hydrocarbon vaporized to increase the carrier gas velocity through said zone above said point where said injected carrier gas is injected, removing a resultant suspension of liberated thiourea from said zone, and separating last-said suspension to recover said thiourea, liberated hydrocarbon and said carrier gas.

3. A process for decomposing an adduct formed by reacting urea with a straight carbon atom chain organic compound selected from the group consisting of straight carbon atom chain hydrocarbons, alcohols and amines having at least six carbon atoms per molecule and a boiling point below the melting point of said urea, which comprises suspending said adduct in an inert carrier gas preheated to a temperature within the range of 70° to 145° F. whereby said adduct is heated to a temperature immediately below the temperature at which it begins to decompose, passing said suspension of said adduct through a decomposition zone at a carrier gas velocity between 3 to 20 feet per second whereby said carrier gas is passed through said zone at an upward velocity greater than that of said adduct, injecting an auxiliary carrier gas preheated to a temperature within the range of 200 to 250° F. into said zone at a point intermediate its ends whereby said adduct is decomposed and the liberated organic componud vaporized to increase the carrier gas velocity through said zone above said point where said auxiliary carrier gas is injected, removing a resultant suspension of liberated urea from said zone, and separating last-said suspension to recover said urea, liberated hydrocarbon and said carrier gas.

4. A process for decomposing an adduct formed by reacting thiourea with a branched carbon atom chain organic compound selected from the class consisting of branched carbon atom chain hydrocarbons, alcohols and amines having at least six carbon atoms per molecule and having a boiling point below the melting point of said thiourea which comprises suspending said adduct in an inert carrier gas preheated to a temperature within the range of 70° to 145° F. whereby said adduct is heated to a temperature immediately below the temperature at which it begins to decompose, passing said suspension of said adduct through a decomposition zone at a carrier gas velocity between 3 to 20 feet per second whereby said carrier gas is passed through said zone at an upward velocity greater than said adduct, injecting auxiliary carrier gas preheated to a temperature within the range of 200 to 250° F. into said zone at a point intermediate its ends whereby said adduct is decomposed and the liberated organic compound is vaporized to increase the carrier gas velocity through said zone above said point where said auxiliary carrier gas is injected, removing a resultant suspension of liberated thiourea from said zone, and separating last-said suspension to recover said thiourea, liberated organic compound and said carrier gas.

5. A process for decomposing an adduct selected from the class consisting of an adduct formed by reacting urea with a straight carbon atom chain hydrocarbon having at least six carbon atoms per molecule and boiling below the melting point of said urea and an adduct formed by reacting thiourea with a branched carbon atom chain hydrocarbon having at least six carbon atoms per molecule and boiling below the melting point of said thiourea which comprises suspending said adduct in an inert carrier gas preheated to a temperature within the range of 70° to 145° F. whereby said adduct is heated to a temperature immediately below the temperature at which it begins to decompose, passing said suspension of said adduct through a decomposition zone at a carrier gas velocity between 3 to 20 feet per second whereby said carrier gas is passed through said zone at a velocity greater than that of said adduct, injecting carrier gas at a temperature within the range of 200 to 250° F. into said zone at a point intermediate its ends whereby said adduct is decomposed and the liberated hydrocarbon vaporized to increase the carrier gas velocity through said zone above said point where said injected carrier gas is injected, removing a resultant suspension of liberated urea or thiourea from said zone, and separating last-said suspension to recover said urea or thiourea, liberated hydrocarbon and said carrier gas.

6. A process for decomposing an adduct selected from the class consisting of an adduct formed by reacting urea with a straight carbon atom chain organic compound selected from the group of straight carbon atom chain hydrocarbons, alcohols and amines having at least six carbon atoms per molecule and a boiling point below the melting point of said urea and an adduct formed by reacting thiourea with a branched carbon atom chain organic compound selected from the group consisting of branched carbon atom chain hydrocarbons, alcohols and amines having at least six carbon atoms and having a boiling point below the melting point of said thiourea which comprises suspending said adduct in an inert preheated carrier gas to heat said adduct to a temperature immediately below the temperature at which it begins to decompose, passing said suspension of said adduct through a decomposition zone at a carrier gas velocity such that said carrier gas is passed through said zone at a velocity greater than that of said adduct, injecting into said zone at a point intermediate its ends an auxiliary carrier gas preheated to a temperature sufficiently high to decompose said adduct and to vaporize the liberated organic compound to thereby increase the carrier gas velocity through said zone above said point where said auxiliary carrier gas is injected, removing a resultant suspension of liberated urea or thiourea from said zone, and separating last-said suspension to recover said urea or thiourea, liberated organic compound and said carrier gas.

7. A process for decomposing an adduct of thiourea with a branched carbon atom chain hydrocarbon having at least six carbon atoms per molecule and a boiling point below 270° F., which comprises suspending said adduct in an inert carrier gas preheated to a temperature within the range of 80° to 150° F., passing the resulting suspension into a decomposition zone, maintaining the velocity of said carrier gas through said zone within a range of 0.5 to 10 feet per second thereby forming a fluidized bed of said adduct in said carrier gas and concomitantly preheating said adduct to a temperature immediately below its decomposition temperature, injecting an auxiliary inert carrier gas preheated to a temperature within the range of 200 to 250° F. into said bed at a point intermediate its ends to heat the preheated adduct in said bed above said injection point to a temperature above its decomposition temperature thereby liberating said adducted hydrocarbon and said thiourea and to concomitantly vaporize said hydrocarbon, passing a resulting suspension of liberated thiourea in carrier gas and vaporized hydrocarbon into a solid-gas separation zone and separating said thiourea from said carrier gas and said vaporized hydrocarbon.

8. A process for decomposing an adduct of urea with a straight carbon atom chain hydrocarbon having at least six carbon atoms per molecule and a boiling point below 270° F., which comprises suspending said adduct in an inert carrier gas preheated to a temperature within the range of 80° to 150° F., passing the resulting suspension into a decomposition zone, maintaining the velocity of said carrier gas through said zone within a range of 0.5 to 10 feet per second thereby forming a fluidized bed of said adduct in said carrier and concomitantly preheating said adduct to a temperature immediately below its decomposition temperature, injecting an auxiliary inert carrier gas preheated to a temperature within the range of 200 to 250° F. into said bed at a point intermediate its ends to heat the preheated adduct in said bed above said injection point to a temperature above its decomposition temperature thereby liberating said adducted hydrocarbon and said urea and to concomitantly vaporize said hydrocarbon, passing a resulting suspension of liberated urea in carrier gas and vaporized hydrocarbon into a solid-gas separation zone and separating said urea from said carrier gas and said vaporized hydrocarbon.

9. A process for decomposing an adduct of urea with a straight carbon atom chain organic compound selected from the class consisting of straight carbon atom chain hydrocarbons, alcohols and amines having at least six carbon atoms and a boiling point below 270° F., which comprises suspending said adduct in an inert carrier gas preheated to a temperature within the range of 80° to 150° F., passing the resulting suspension into a decomposition zone, maintaining the velocity of said carrier gas through said zone within a range of 0.5 to 10 feet per second thereby forming a fluidized bed of said adduct in said carrier gas and concomitantly preheating said adduct to a temperature immediately below its decomposition temperature, injecting an auxiliary inert carrier gas preheated to a temperature within the range of 200 to 250° F. into said bed at a point intermediate its ends to heat said preheated adduct in said bed to a temperature above its decomposition temperature thereby liberating said adducted straight-chain organic compound and said urea and concomitantly vaporizing said organic compound, passing a resulting suspension of liberated urea in carrier gas and vaporized organic compound into a solid-gas separation zone and separating said urea from said carrier gas and said vaporized organic compound.

10. A process for decomposing an adduct of thiourea with a branced carbon atom chain organic compound selected from a class consisting of branched carbon atom chain hydrocarbons, alcohols and amines having at least six carbon atoms and a boiling point below 270° F., which comprises suspending said adduct in an inert carrier gas preheated to a temperature within the range of 80° to 150° F., passing the resulting suspension into a decomposition zone, maintaining the velocity of said carrier gas through said zone within a range of 0.5 to 10 feet per second thereby forming a fluidized bed of said adduct in said carrier gas and concomitantly preheating said adduct to a temperature immediately below its decomposition temperature, injecting an auxiliary inert carrier gas preheated to a temperature within the range of 200 to 250° F. into said bed at a point intermediate its ends to heat the preheated adduct in said bed to a temperature above its decomposition temperature thereby liberating said adducted organic compound and said thiourea and concomitantly vaporizing said organic compound, passing a resulting suspension of liberated thiourea in carrier gas and vaporized organic compound into a solid-gas separation zone and separating said thiourea from said carrier gas and said vaporized organic compound.

11. A process for decomposing an adduct selected from the class consisting of the adduct reaction product of urea with a straight carbon atom chain organic compound and the adduct reaction product of thiourea with a branched carbon atom chain organic compound, said organic compound being selected from a class consisting of straight carbon atom chain and branched carbon atom chain hydrocarbons, alcohols and amines having a boiling point below 270° F., which comprises suspending said adduct in an inert carrier gas preheated to a temperature within the range of 80° to 150° F., passing the resulting suspension into a decomposition zone, maintaining the velocity of said carrier gas through said zone within a range of 0.5 to 10 feet per second thereby forming a fluidized bed of said adduct in said carrier gas, and concomitantly preheating said adduct to a temperature immediately below its decomposition temperature, injecting an auxiliary inert carrier gas preheated to a temperature within the range of 200 to 250° F. into said bed at a point intermediate its ends to heat said preheated adduct in said bed to a temperature above its decomposition temperature thereby liberating said adducted organic compound and said urea or thiourea and concomitantly vaporizing said organic compound, passing a resulting suspension of liberated urea or thiourea in carrier gas and vaporized organic compound into a solid-gas separation zone and separating said urea or thiourea from said carrier gas and said vaporized organic compound.

12. A process for decomposing an adduct selected from the class consisting of the adduct reaction product of urea with a straight carbon atom chain organic compound and the adduct reaction product of thiourea with a branched carbon atom chain organic compound, said organic compound being selected from a class consisting of straight carbon atom chain and branched carbon atom chain hydrocarbons, alcohols and amines having a boiling point below 270° F. which comprises forming in a decomposition zone a fluidized bed of said adduct suspended in a preheated inert carrier gas to thereby preheat said adduct to a temperature immediately below its decomposition temperature, injecting an auxiliary preheated inert carrier gas into said bed at a point intermediate its ends to heat the preheated adduct in said bed to a temperature above its decomposition temperature thereby liberating said adducted organic compound and said urea or thiourea and to concomitantly vaporize said organic compound, passing a resulting suspension of liberated urea or thiourea in carrier gas and vaporized organic compound into a solid-gas separation zone and separating said urea or thiourea from said carrier gas and said vaporized organic compound.

GARDNER C. RAY.

REFERENCES CITED

The following references are of record in the file of this patent:

UNITED STATES PATENTS

| Number | Name | Date |
|---|---|---|
| 1,984,380 | Odell | Dec. 18, 1934 |
| 2,515,134 | Murphree | July 11, 1950 |
| 2,518,677 | Garner | Aug. 15, 1950 |
| 2,520,715 | Fetterly | Aug. 29, 1950 |
| 2,520,716 | Fetterly | Aug. 29, 1950 |